United States Patent [19]

Morse

[11] Patent Number: 5,346,755
[45] Date of Patent: Sep. 13, 1994

[54] STAIN RESISTANT CLEANABLE PVC FABRIC

[75] Inventor: David R. Morse, Sandown, N.H.

[73] Assignee: Borden, Inc., Columbus, Ohio

[21] Appl. No.: 147,786

[22] Filed: Nov. 4, 1993

[51] Int. Cl.$^5$ .............................................. B32B 27/08
[52] U.S. Cl. .................... 428/286; 428/519; 428/520; 525/235
[58] Field of Search ............... 428/515, 519, 521, 522, 428/518, 517, 286

[56] References Cited

U.S. PATENT DOCUMENTS

| | | | |
|---|---|---|---|
| 2,907,882 | 10/1959 | Patton | 250/80 |
| 3,418,274 | 12/1968 | Caplan et al. | 260/41 |
| 3,595,819 | 7/1971 | Dakli et al. | 260/23 |
| 3,804,705 | 4/1974 | Kishikawa | 161/253 |
| 4,020,216 | 4/1977 | Miller | 428/425 |
| 4,761,333 | 8/1988 | Takimoto et al. | 428/327 |

FOREIGN PATENT DOCUMENTS

| | | |
|---|---|---|
| 0549932 | 12/1957 | Canada . |
| 0550610 | 12/1957 | Canada . |

OTHER PUBLICATIONS

"Elvacite Acrylic Resins" Du Pont, p. 2, Table III p, 14, Table VI.
Material Safety Data Sheet (LDY004), Du Pont.
"Elvaloy HP, Resin Modifier", Du Pont.
"Solvent Borne Aeryloid Thermoplastic Solution Grade & Solid Grade Acrylic Resins For Industrial Finishes", 1990, Rohm & Haas pp. 2, 3, 4, and 20.
Handbook of Polyvinyl Chloride Formulating, E. J. Wickson, 1993, John Wiley & Sons, pp. 223–224 and 601–602.

*Primary Examiner*—James J. Seidleck
*Assistant Examiner*—Mary Critharis
*Attorney, Agent, or Firm*—Kenneth P. Van Wyck

[57] ABSTRACT

A stain resistant, easily cleanable and flexible plastic coated film comprising a base film and a coating thereon wherein the base film comprises a polyvinyl chloride resin, a polymeric plasticizer, and a member selected from the group consisting of acrylonitrile-butadiene copolymer rubber and ethylene-n-butyl acrylate-carbon monoxide polymer and the coating comprises polymethyl methacrylate alone or together with a flexibilizing polymer such as vinyl chloride-vinyl acetate copolymer and/or a flexibilizing copolymer of methyl methacrylate. The coated film gives superior oil and stain resistance as compared to the base film or coating alone.

20 Claims, No Drawings

STAIN RESISTANT CLEANABLE PVC FABRIC

BACKGROUND OF THE INVENTION

1. Field of the Invention

This invention relates to a flexible, alloyed, polyvinyl chloride (PVC) resin film, also referred to simply as PVC/alloy film, which is coated with an acrylic stain resistant coating. The coated film resists staining, is oil and grease resistant and is easily cleanable. Combining the PVC/alloy film with the stain resistant acrylic coating gives superior oil and stain resistance than either the film or coating on its own. The coated film can be post laminated to various fabric substrates.

2. Description of the Related Art

PVC/alloys have been in existence for some time. PVC/NBR (acrylonitrile-butadiene rubber) alloys are used in automotive dash boards and door panels.

Flexible PVC is laminated to various fabric substrates for use in upholstery, boat and machinery covers, table clothes, etc. These products do not last very long because dirt and stains are not cleanable from the vinyl surface. Oil and greases also extract plasticizer from the vinyl causing embrittlement and even cracking. There has been a long search for materials that will increase the useful life of the laminated vinyl.

Currently, flexible PVC laminated fabric products consist of monomeric plasticized PVC film coated with a vinyl, vinyl/acrylic or urethane topcoat. Staining agents migrate through the coating and into the plasticizer of the PVC film. This creates a permanent stain. Stain resistant products currently on the market are only marginally more effective than conventional plasticized PVC coated products.

SUMMARY OF THE INVENTION

The present invention comprises a flexible PVC/alloy film coated with an acrylic stain resistant coating having sufficient flexibility for the intended application of the coated film. Briefly, this invention involves the formation of a base film by alloying PVC resin with an acrylonitrile-butadiene copolymer rubber (NBR) for interior applications or alloying the PVC resin with an ethylene-n-butyl acrylate-carbon monoxide polymer for exterior applications. The alloyed film is then coated with an acrylic coating of: (1) polymethyl methacrylate (homopolymer) for end uses such as wall coverings which normally do not require high flexibility such as frequent creasing; or (2) the polymethyl methacrylate together with flexibilizing polymers such as a methyl methacrylate copolymer and/or a vinyl chloride-vinyl acetate copolymer for applications requiring more flexibility or creasing. One application requiring extensive flexibility and creasing is that of seat cushions wherein the flexibilizing polymer is preferably a copolymer of methyl methacrylate with a alkyl acrylate, a vinyl chloride-vinyl acetate copolymer; or mixtures thereof.

One embodiment of the invention involves the above described coated film.

Another embodiment of the invention involves the above described coated film laminated to a fabric substrate.

The base film is a formulation which provides for low migration which resists oil and grease penetration. The acrylic topcoat works synergistically with the base film to improve stain resistance and cleanability. The useful life of the vinyl product/fabric is greatly extended by this invention.

One of the important problems solved by this invention is inhibiting or preventing plasticizer migration by use of the alloying materials and polymeric plasticizers with PVC resin.

DETAILED DESCRIPTION OF THE INVENTION

The invention of this application incorporates a two phase approach for making flexible PVC resin stain and oil resistant. Both approaches combine to give excellent oil resistance, stain resistance and cleanability. Phase I involves an oil resistant flexible PVC resin base film. This is done by alloying PVC resin with acrylonitrile-butadiene copolymer rubber for interior products or alloying PVC resin with ethylene-n-butyl acrylate-carbon monoxide polymer for exterior products.

Phase II involves applying a polymethyl methacrylate coating to the PVC/alloy base film. This acrylic coating exhibits excellent UV properties and stain resistance. The combination of Phase I (PVC/alloy) and Phase II (antistain coating) produce a product with superior oil and stain resistance as well as improved cleanability.

The PVC resin for the base film is preferably that of a high molecular weight PVC resin, i.e., one having a molecular weight of about 115,000 to 150,000 or a mixture of high molecular weight PVC resin and up to about 50% by weight, preferably from about 5% to 40% by weight of an ultra high molecular weight PVC resin, i.e., one having a molecular weight of at least 185,000 such as from about 185,000 to 225,000, e.g., OXY 410 of the Occidental Chemical Corporation.

The polyvinyl chloride resin used in the base film of the present invention will have a vinyl chloride unit content of at least 90% by weight, preferably at least 95% by weight and includes homopolymers of vinyl chloride, copolymers of vinyl chloride with ethylenically unsaturated monomers copolymerizable therewith and mixtures thereof. Polyvinyl chloride polymers prepared by emulsion polymerization, suspension polymerization, or bulk polymerization may be used in the present invention. The ethylenically unsaturated comonomers copolymerizable with vinyl chloride may be a variety of known compounds. Typical examples include olefinic compounds such as ethylene and propylene, vinyl esters such as vinyl acetate and vinyl propionate, unsaturated carboxylic acids and the esters or amide thereof such as acrylic acid, methacrylic acid, methyl acrylate, etc.

The ultra high molecular weight PVC resin acts as a processing aid in the alloyed base film and makes the surface of the film less tacky and duller. Additionally, it improves thermal resistance.

Conventional polymeric plasticizers can be used in the PVC film of this invention. Polymeric plasticizers are condensation products of polyhydric alcohols, e.g. glycols, and dibasic organic acids. Illustrative of the polyhydric alcohols there can be mentioned 1,2-propylene glycol, 1,3-butylene glycol, diethylene glycol, etc. Illustrative of dibasic acids there can be mentioned sebacic acid, azelaic acid, adipic acid, etc.

Conventional monomeric plasticizers for PVC can optionally be used in this invention. Illustrative of monomeric plasticizers there can be mentioned: phthalic acid esters such as dibutyl phthalate, dioctyl phthalate, diisodecyl phthalate, diisoundecyl phthalate, etc.; trimellitic acid esters such as trioctyl trimellitate, tri-2-ethylhexyl trimellitate, tridecyl trimellitate, etc.; adipic acid esters such as dioctyl adipate, diisodecyl adipate, etc.; phosphoric acid esters such as tricresyl phosphate, trioctyl phosphate, etc; epoxy plasticizers and liquid polyesters. The preferred monomeric plasticizers are those of the phthalic acid esters and adipic acid esters, particularly those wherein each of the hydrocarbyl substituents on the phthalate or adipate are straight chain alkyl groups having at least 7 carbon atoms such as that of 7 to 11 carbon atoms.

The compositions can also include processing aids such as acrylic processing aids. The quantity of processing aid, when used, will vary from about 0.5 to 10 parts for each 100 parts of PVC resin.

The base film formulation will generally include conventional additives such as antioxidants, ultra violet (U.V.) absorbers, costabilizers, lubricants, silica gloss reducing agents, pigments and fillers.

The key ingredients in the PVC base film are: (1) the alloying materials of either acrylonitrile-butadiene rubber (NBR) or ethylene-n-butyl acrylate-carbon monoxide polymer; (2) a polymeric plasticizer; and (3) optionally monomeric plasticizer. The ratio of alloy/polymeric plasticizer can be varied to modify the oil resistance and the flexibility of the film. The quantity of such ingredients can vary over a wide range.

The quantity of the NBR or ethylene-n-butyl acrylate-carbon monoxide alloy material will preferably vary from about 10 to 50 parts and particularly 20 to 40 parts per one hundred parts (PHR) of the PVC resin. The quantity of polymeric plasticizer will preferably vary from about 10 to 60 parts and particularly 20 to 50 parts for each 100 parts by weight of the PVC resin. The use of monomeric plasticizer such as DIDP (diisodecyl phthalate) is optional but can be used in quantities of up to about 50 parts such as 5 to 40 parts per one hundred parts of the PVC resin.

The acrylonitrile-butadiene rubber in the base film, when used, will normally contain from 15% to 50% of acrylonitrile, by weight, and preferably about 25% to 40% by weigh of acrylonitrile based on the weight of the rubber with the remainder of the rubber being the butadiene.

Conventional heat stabilizers can be employed in the PVC base film. Thus, the stabilizer can be a salt of a carboxylic acid with a metal such as barium, tin, calcium, magnesium, zinc or the like either individually or in combination. Also, the stabilizer can be an organic ester of phosphorous acid or the like and combinations of such ester with a carboxylic acid salt. The total quantity of heat stabilizer can vary over a broad range such as from 1 to 6 parts by weight based on each 100 parts of PVC resin.

The PVC resin can contain costabilizers such as epoxy compounds, e.g., epoxidized soybean oil, epoxidized linseed oil, epoxidized castor oil, butyl ester of epoxidized linseed oil fatty acid, butyl or 2-ethylepoxystearate, and the like. The quantity of costabilizer, when used, can vary from about 1 to 15 parts based on each 100 parts of PVC resin.

The acrylic stain resistant topcoat of this invention offers superior stain resistance as compared to conventional vinyl, vinyl/acrylic or urethane coatings. In cases where high flexibility is not required, such as for use in wall coverings, polymethyl methacrylate (homopolymer) can be used alone as the top coat. However, for more flexible applications such as seat covers and other upholstery uses which may involve creases and folds in the product, the addition of a flexibilizing methyl methacrylate copolymer, a flexibilizing PVC-vinyl acetate copolymer or mixtures thereof to the polyvinyl methacrylate impart more flexibility to the coating. Such flexibility avoids cracking of the top coat. Such top coat creates a coating that is stain resistant yet flexible enough to adhere properly to the PVC alloy sheet.

The key ingredient in the coating is polymethyl methacrylate homopolymer. However, to increase flexibility, a flexibilizing polymer for the polymethyl methacrylate is added to the coating formulation. Illustrative of flexibilizing polymers there can be mentioned: various copolymers of methyl methacrylate, vinyl copolymers, and low molecular weight PVC homopolymers.

The vinyl chloride-vinyl acetate flexibilizing copolymer in the top coat, when used, will normally contain from about 5% to 20% of vinyl acetate, and preferably about 7% to 15% with the remainder of the copolymer being the vinyl chloride.

The flexibilizing methyl methacrylate copolymer can be a copolymer of methyl methacrylate with from about 5% to 50% by weight of the copolymer and preferably 10% to 40% thereof of: (a) a medium to long chain alkyl methacrylate such as one having about 4 to 10 carbon atoms in the alkyl group, e.g. a copolymer of methyl methacrylate and n-butyl methacrylate or 2-ethylhexyl methacrylate; or (b) an alkyl acrylate such as one having up to about 10 carbon atoms in the alkyl group, e.g. a copolymer of methyl methacrylate and ethyl acrylate.

The low molecular weight PVC homopolymer used as a flexibilzer can be one such as V-95 which is supplied by Borden, Inc. having a molecular weight range Mw of 80,000 to 100,000.

The concentration of the flexibilizing polymer, when used, can vary over a broad range such as up to 75% of each flexibilizing polymer by weight of the polymethyl methacrylate homopolymer, provided that the polymethyl methacrylate homopolymer is at least 50% by weight of the solid polymeric materials in the coating. Preferably the quantity of each flexibilizing polymer will vary from about 5% to 25% based on the weight of the polymethyl methacrylate homopolymer. The various flexibilizing polymers can be used in the top coat either alone/or in combination.

The polymethyl methacrylate (homopolymer) should make up at least 50% by weight of the polymeric materials in the solid coating, preferably at least 60%.

Conventional ultra violet (U.V.) light absorbers can be used in the base film and coating of this invention. Such U.V. absorbers can be that of a benzotriazole compound, benzophenone compound, or a hindered amine compound and specifically includes 2-(3,5-di-t-butyl-2-hydroxyphenyl)benzotriazole; 2-(3,5-di-t-butyl-2-hydroxyphenyl)- 5-benzotriazole; polycondensate of dimethyl succinate with 1-(2-hydroxyethyl)-4-hydroxy-2,2,6,6-tetramethylpiperidine, various 2-hydroxy-4-alkoxybenzophenones, e.g., 5,5'-methylenebis(2-hydroxy-4-lauroxybenzophenone), 5,5'-methylenebis(2-hydroxy-4-octoxybenzophenone), and the like. The quantity of U.V. absorber, when used, will generally vary from 0.1 to 1 part for each 100 parts, by weight of the PVC resin.

Preferred formulations for this invention are shown below.

PHASE 1 PVC/ALLOY FILM

| | Supplier | Parts/wt |
|---|---|---|
| Formulation I (Interior) | | |
| High molecular weight PVC (VC106) | (1) | 100 |
| Acrylonitrile-butadiene copolymer rubber (HYCAR 1422 X14) (NBR) | (2) | 40 |
| Epoxidized soybean oil (DRAPEX 6.8) | (3) | 3 |
| Polyester plasticizer (DRAPEX P1) | (3) | 30 |
| Plasticizer (DIDP-diisodecyl phthalate) | | 28.5 |
| barium zinc liquid stabilizer (MARK 4753) | (3) | 2.5 |
| acrylic process aid (ACRYLOID K120N) | (4) | 1.5 |
| Acrylic dulling agent (ACRYLOID KF710) | (4) | 2 |
| polyethylene lubricant (AC# 617A) | (5) | 0.5 |
| pigmentation | | as required |
| calcium carbonate | | 20 |
| Formulation E (Exterior) | | |
| High molecular weight PVC (VC106) | (1) | 100 |
| Ethylene-n-butyl acrylate-carbon monoxide (ELVALOY HP) | (6) | 30 |
| Epoxidized soybean oil (DRAPEX 6.8) | (3) | 3 |
| Polyester plasticizer (DRAPEX P1) | (3) | 25 |
| Plasticizer (DIDP-diisodecyl phthalate) | | 25 |
| Barium zinc liquid stabilizer (MARK 4731) | (3) | 2.5 |
| Acrylic process aid (ACRYLOID K120N) | (4) | 4 |
| Acrylic dulling agent (ACRYLOID KF710) | (4) | 2 |
| Antioxidant (IRGANOX 1010) | (7) | 0.5 |
| Ultraviolet stabilizer (MARK 1413) | (3) | 0.3 |
| Polyethylene lubricant (AC# 617A) | (5) | 0.5 |
| Pigmentation | | as required |
| Calcium carbonate | | 20 |
| Biocide (VINYZENE BP5-5) | (8) | 1.5 |

PHASE II—STAIN RESISTANT COATING

A typical solution of a stain resistant coating which can be applied and dried on to the base film is shown below.

| | | |
|---|---|---|
| Polymethyl methacrylate homopolymer (ELVACITE 2010) | (6) | 10.5 |
| Methyl methacrylate-ethyl acrylate copolymer (ACRYLOID B82) | (4) | 2.6 |
| Vinyl chloride/Vinyl acetate Copolymer (VC171) | (1) | 4.4 |
| Cellulose Acetate Butyrate (CAB 0.5) | (9) | 0.5 |
| Silica Dulling Agent (SYLOID 234) | (10) | 1.8 |
| Ultra Violet Stabilizer (SANDOZ VSU) | (11) | 0.2 |
| Solvent (Methylethyl Ketone) | | 80.0 |
| TOTAL | | 100.0 |

SUPPLIERS OF THE INGREDIENTS OF THE ABOVE PVC/ALLOY FILM AND THE STAIN RESISTANT TOPCOAT (1) Borden Chemicals & Plastics
(2) Zeon Chemicals Inc.
(3) Witco, Inc.
(4) Rohm and Haas
(5) Allied Chemical
(6) Dupont
(7) Ciba Geigy
(8) Morton International
(9) Eastman Chemical
(10) W. R. Grace
(11) Sandoz The preferred method for preparing the flexible PVC/alloy film and its coating is described below:

A. A steam-heated ribbon blender is charged with 3,600 pounds of compound by sequential addition of ingredients, except for the ethylene-n-butyl acrylate-carbon monoxide polymer in the case of the exterior formulation, of the Phase I alloy film in the appropriate ratios. The blender is operated at approximately 175° F. for 20 minutes or until the compound appears dry.

B. The dry compound is than dropped in batches of approximately 160 pounds into a banbury mixer. In case the alloy is ethylene-n-butyl acrylate-carbon monoxide polymer, this polymer is added directly to the banbury by stepwise addition to insure proper dispersion. The compound is fluxed and masticated within the banbury for 5 minutes. The pigmentation is fluxed with the compound in this step. At a temperature of about 350° F. the globular plastic batch is dropped onto a two-roll mill and is then fed onto a two-roll feedmill. The dwell time of the material in the two-roll mill is dependent upon the speed of the calender and the banbury drop frequency. The mills are heated at 350° F.

C. From the feed mill the material is run into an extruder which extrudes a "rope" onto a conveyor which deposits the material between the No. 1 and No. 2 rolls in the top of the calender. These calenders are the inverted "L" type. The No. 1 and No. 2 rolls are parallel to each other arranged horizontally. Roll No. 3 is directly beneath and parallel to Roll No. 2 and Roll NO. 4 is beneath roll No. 3. The rolls are oil heated to 370° F. for rolls No. 1 and No. 2, 399° F. for Roll No. 3 and 345° F. for roll No. 4. The calender is adjusted so that the sheet emerges with the correct thickness. Thicknesses of 0.004 inches to 0.020 inches are most common for this sheet. The sheet is sent through an embossing station, a series of cooling cans, an accumulator and finally to a winder. The final sheet is wound into rolls for subsequent printing, coating and lamination to fabric.

D. The film is than printed and or coated using the stain resistant coating. The coating is applied via the rotogravure process. The engraved roller of choice is a 100 line quadrangle configuration with a cell depth of 0.0040 inches. The coated web is dried using a series of high impingement air nozzles at a temperature of 120° F.

E. The coated film is then laminated to fabric substrate using a vinyl plastisol adhesive. The fabrics of choice are polyester non wovens (3.0–6.0 ounces per square yd) or polyester weft insertion warp knits. Three ply constructions are preferred when using the weft insertion warp knits. The film thickness of a three ply construction can be that of 0.003 to 0.02 inches whereas that of the two ply construction can be from about 0.004 to 0.02 inches thick. The constructions are as follows:

| 3 ply | 2 ply |
|---|---|
| Antistain Topcoat | Antistain Topcoat |
| PVC/Alloy film | PVC/Alloy Film |
| Vinyl Plastisol Adhesive | Vinyl Plastisol Adhesive |
| Polyester Weft Insertion Warp Knit | Polyester Non Woven |
| PVC/Alloy Film | |

The following examples are illustrative of the invention and its advantageous properties. In these examples, as well as elsewhere in this application, all parts are by weight unless otherwise indicated.

EXAMPLE 1

Samples of PVC/alloy Formulation I (Interior) as shown above were coated in the laboratory using the antistain coating. The coating was prepared on a laboratory homogenizer and applied to the PVC/alloy film I (Interior) using a #12 wire wound draw down bar. The coating was dried for 1 minute at 200° F. in a forced hot air oven. Staining agents were applied to the coated product and allowed to stand for 30 minutes. The staining agents used were red lip stick, ball point pen, permanent marker and "Frenches" yellow mustard, After the 30 minutes aging the stains were cleaned off using a 3 step process which consisted of: Step 1—Warm tap water; Step 2—"Fantastic" liquid cleaner; and Step 3—Isopropyl alcohol (rubbing alcohol).

Results: All four stains cleaned completely off the experimental product while a conventional product and competitive PREFIX material of GEnCorp Fabricated Plastics Division of GenCorp Polymer Products Co. left deep noticeable stains. The conventional product formulation for the base film referred to in these examples was as follows:

| Ingredient | Parts by Weight |
| --- | --- |
| (A) FORMULATION FOR THE CONVENTIONAL BASE FILM | |
| PVC Resin | 100 |
| Calcium carbonate | 20 |
| Epoxidized soy bean oil | 3 |
| Phthalate plasticizer (DINP) | 78 |
| Barium-zinc liquid stabilizer | 2 |
| Acrylic process aid (Acryloid Kizon) | 1.5 |
| Stearic acid lubricant | 0.4 |
| Pigmentation | As required |
| (B) FORMULATION FOR THE CONVENTIONAL TOPCOAT | |
| Vinyl chloride/vinyl acetate resin (VC 171) | 15.0 |
| Polymethyl methacrylate homopolymer (ELVACITE 2010) | 3.8 |
| Cellulose acetate butyrate (CAB 0.5) | 0.6 |
| Epoxidized soybean oil (EPO) | 0.6 |
| Methyl ethyl ketone | 80 |
| Total | 100 |

EXAMPLE 2

PVC/alloy I (Interior) as shown above was coated using the antistain topcoat shown in the Phase II formulation above. The coating was applied using a 100 line quadrangle engraved roller. The coating deposition was approximately 0.02 pounds dry/linear yard (54 inches). The coating was applied to the PVC/alloy film on a 6-color rotogravure printer. This material was then laminated to 4 ounce polyester non woven fleece. The finished fabric was tested for stain resistance to red lipstick, ball point pen, permanent marker and Frenches yellow mustard. Stain resistance was tested for 30 minutes and also for 9 days.

Results: All stains cleaned off completely even after 9 days aging. This performance far exceeded all other products tested.

EXAMPLE 3

Samples of PVC/alloy formulation E (Exterior), as shown above, were prepared in the laboratory on a 2 roll mill and coated with the stain resistant coating of the Phase II formulation shown above using a #12 wire wound bar. Staining agents were applied and cleaned off after 30 minutes as specified in EXAMPLE 1.

Results: All four stains cleaned completely from the experimental product. Accelerated weathering studies on this PVC/alloy formulation E (Exterior) showed no discoloration after 500 hours in a Q-U-V weatherometer using UVB-313 bulbs. The PVC/alloy formulation I (Interior) discolored after 100 hours. The Q-U-V weatherometer is manufactured by Q Panel Company of Cleveland, Ohio and the UVB-313 bulbs are known for their aggressive ultra violet radiation.

EXAMPLE 4

A series of comparative tests were performed with five different products using various base films and coatings to determine stain resistance. The staining agents used were red lip stick, ball point pen (blue), permanent marker, and "Frenches" yellow mustard. Stain resistance was tested for 30 minutes and also at 7 days. The staining agents were removed using a three stop process of warm tap water, "Fantastic" liquid cleaner, and isopropyl alcohol. The five products which were tested are described below:

Product 1. This was a conventional monomeric plasticized PVC base film without topcoat. The formulation of the base film was the same as that of the conventional product formulation used as a comparison in EXAMPLE 1.

Product 2. This was the preferred Formulation E (Exterior) which is described above and which was also used in EXAMPLE 3 but the topcoat was not applied to the film.

Product 3. This was the conventional PVC base film used in Product 1 but it was coated with the PHASE II STAIN RESISTANT COATING set forth hereinabove in the preferred formulations, Product 4. This was the preferred vinyl alloy Formulation E (Exterior) as used in Product 2 but with a conventional dried vinyl coating from the following wet formulation:

| Ingredient | Parts by Weight |
| --- | --- |
| Vinyl chloride/vinyl acetate copolymer (VC 171) | 15.4 |
| Polymethyl methacrylate homopolymer (ELVACITE 2010) | 3.8 |
| Cellulose Acetate Butyrate (CAB 0.5) | 0.6 |
| Epoxidized soybean oil (DRAPEX 6.8) | 0.2 |
| Solvent (methyl ethyl ketone) | 80.0 |
| Total | 100.0 |

Product 5. This was vinyl alloy Formulation E as in Products 2 and 4 with the same antistain coating as in Product 3.

The results of these tests is shown below for the 30 minute test and for the 7 day test.

| Product | |
| --- | --- |
| 30 Minute Test | |
| 1. | Severe stains left from all staining agents. |
| 2. | Moderate stains from pen, marker and mustard. |
| 3. | Moderate stains from pen and marker. |
| 4. | Moderate stains from pen and marker. |
| 5. | All four stains cleaned off completely. |
| 7 Day Test | |
| 1. | Severe staining left from all staining agents. |

-continued

| Product | |
|---|---|
| 2. | Moderate staining left from all staining agents. |
| 3. | Severe staining left from all agents. |
| 4. | Moderate staining left from all agents. |
| 5. | Very slight staining left from the permanent marker whereas the other stains cleaned off completely. |

It can be seen from the above tests that the alloy/stain resistant coating system of this invention clearly out performs the additive effect of its component parts.

What is claimed is:

1. A flexible plastic coated film comprising a base film and a polymeric coating thereon wherein:
   A. the base film comprises a polyvinyl chloride resin, from about 10 to 60 parts by weight for each 100 parts of resin of a polymeric plasticizer resulting from the condensation of a polyhydric alcohol and a dibasic organic acid and about 10 to 50 parts based on 100 parts by weight of the resin of an alloying polymer selected from the group consisting of acrylonitrilebutadiene copolymer rubber and ethylene-n-butyl acryiate-carbon monoxide polymer; and
   B. the coating comprises a member selected from the group consisting of polymethyl methacrylate and polymethyl methacrylate mixed with a flexibilizing polymer for the polymethyl methacrylate, and mixtures thereof;
   C. the quantity of polymethyl methacrylate is at least 50% by weight of the polymeric material in the coating; and
   D. the plastic coated film has a thickness of about 0.003 to 0.02 inches.

2. The coated film of claim 1 wherein the coating comprises at least 60% by weight of polymethyl methacrylate based on the quantity of polymer in the coating.

3. The coated film of claim 2 wherein the flexibilizing polymer is selected from the group consisting of: a copolymer of methyl methacrylate and an alkyl methacrylate having from 4 to 10 carbon atoms in the alkyl group; a copolymer of methyl methacrylate and an alkyl acrylate; a copolymer of vinyl chloride and vinyl acetate; and a low molecular weight polyvinyl chloride homopolymer.

4. The coated film of claim 3 wherein the alloying polymer is acrylonitrile-butadiene rubber.

5. The coated film of claim 3 wherein the alloying polymer is ethylene-n-butyl acrylate-carbon monoxide polymer.

6. The coated film of claim 3 wherein the coating includes a flexibilizing vinyl chloride-vinyl acetate copolymer.

7. The coated film of claim 3 wherein the coating includes a flexibilizing methyl methacrylate copolymer.

8. The coated film of claim 3 wherein the coating includes both a flexibilizing vinyl chloride-vinyl acetate copolymer and a flexibilizing copolymer of methyl methacrylate and an alkyl acrylate.

9. The coated film of claim 3 wherein the coating includes a low molecular weight polyvinyl chloride homopolymer.

10. The coated film of claim 3 wherein the coating is that of polymethyl methacrylate.

11. A flexible polyvinyl chloride resin film of a base film coated with a polymeric stain resistant coating wherein:
    A. the base film comprises for each 100 parts of polyvinyl chloride resin from 10 to 60 parts of a polymeric plasticizer which is the condensation product of a polyhydric alcohol and a dibasic organic acid, 10 to 50 parts of an alloying polymer selected from the group consisting of (a) an acrylonitrilebutadiene copolymer rubber containing about 15% to 50% by weight thereof of acrylonitrile; and (b) ethylene-n-butyl acrylate-carbon monoxide polymer, the parts of ingredients in said base film being by weight; and
    B. said film is coated with a polymeric coating containing at least 50% by weight of polymethyl methacrylate.

12. The film of claim 11 wherein the alloying polymer is ethylene-n-butyl acrylate-carbon monoxide polymer.

13. The film of claim 11 wherein the alloying polymer is acrylonitrile-butadiene copolymer rubber.

14. The film of claim 11 wherein the coating includes a flexibilizing polymer selected from the group consisting of: a methyl methacrylate copolymer; a vinyl chloride-vinyl acetate copolymer; a low molecular weight polyvinyl chloride homopolymer; and mixtures thereof wherein the quantity of flexibilizing polymer is mo more than 50% by weight of the polymers in the coating.

15. The film of claim 11 laminated to a fabric substrate and wherein the thickness of said film is from about 0.003 to 0.02 inches.

16. The film of claim 11 wherein the polyvinyl chloride resin in the base film is a homopolymer of vinyl chloride.

17. The film of claim 11 wherein the polyvinyl chloride resin in the base film contains at least 95% by weight of vinyl chloride and the coating consists of polymethyl methacrylate.

18. A flexible stain resistant and cleanable coated film comprising a base film and a polymer coating thereon wherein:
    A. the base film comprised 100 parts of polyvinyl chloride resin, 10 to 60 parts of polymeric plasticizer wherein the polymeric plasticizer is the condensation product of a polyhydric alcohol and a dibasic organic acid, and an alloying polymer selected from the group consisting of 10 to 50 parts of acrylonitrile-butadiene copolymer rubber and ethylene-n-butyl acrylate -carbon monoxide polymer, said parts being by weight of the base film, and
    B. the coating comprises at least 50% of polymethyl methacrylate based on the weight of polymer in the coating.

19. The film of claim 18 wherein: the polyvinyl chloride resin has a vinyl chloride unit content of at least 95% by weight and a molecular weight of about 115,000 to 225,000 wherein at least 50% thereof by weight has a molecular weight of 115,00 to 150,000; the quantity of polymeric plasticizer is 20 to 50 parts; the quantity of alloying polymer is from 20 to 40 parts.

20. The film of claim 19 wherein the coating includes flexibilizing polymers of a copolymer of methyl methacrylate and alkyl acrylate as well as a copolymer of vinyl chloride and vinyl acetate, and wherein the alloying polymer is ethylene-n-butyl acrylate-carbon monoxide polymer.

* * * * *